Dec. 4, 1951 F. DURST 2,577,515
ELECTRICAL SOLDERING PLIERS
Filed July 3, 1948
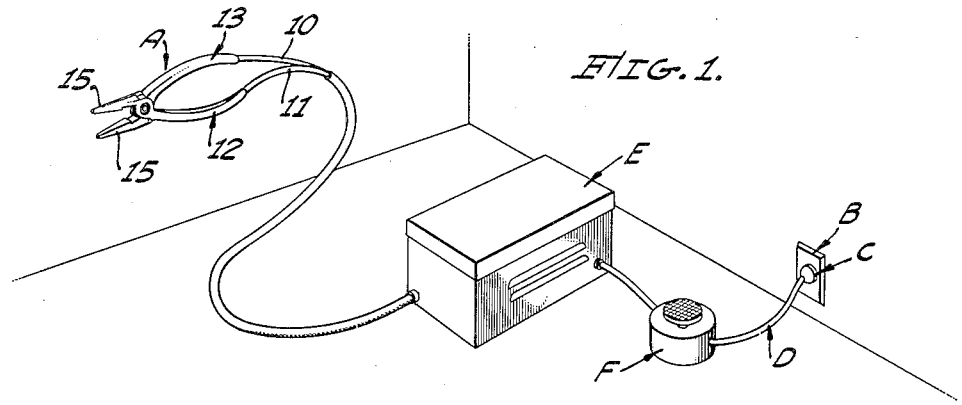
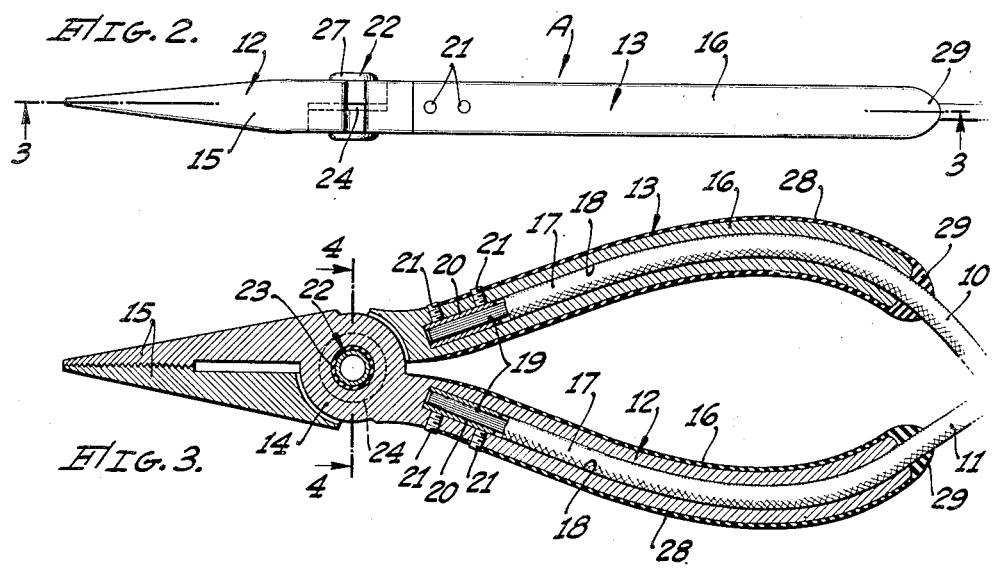
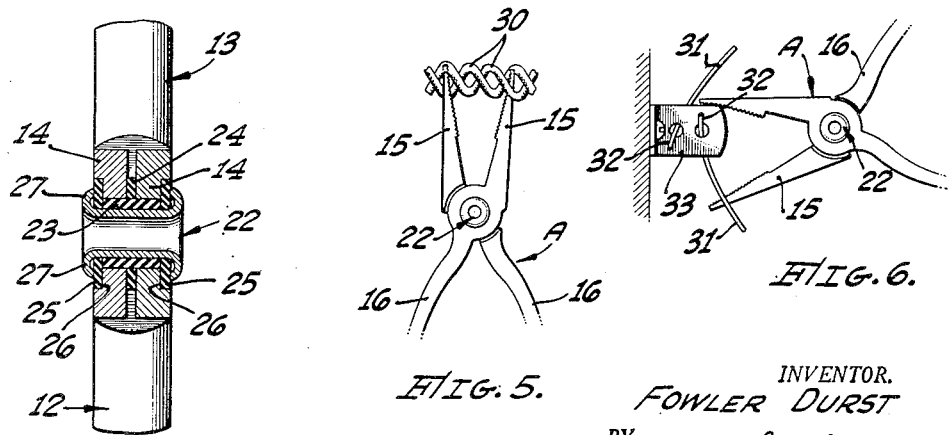
INVENTOR.
FOWLER DURST
BY
John Flann
ATTORNEY.

Patented Dec. 4, 1951

2,577,515

UNITED STATES PATENT OFFICE 2,577,515

ELECTRICAL SOLDERING PLIERS

Fowler Durst, Los Angeles, Calif.

Application July 3, 1948, Serial No. 36,947

1 Claim. (Cl. 219—26)

The present invention relates to soldering apparatus, and more particularly to electrical pliers adapted to be used in soldering operations.

An object of the invention is to provide current conducting pliers which may be used in essentially the same manner as ordinary pliers, as well as in the performance of soldering operations. Accordingly, the multiple use to which the single electrical pliers can be put expedites production and increases plant capacities.

An object of the invention is to provide current conducting soldering pliers, which are capable of applying a substantial clamping force to the work without deleterious effects on the pliers.

Another object of the invention is to provide current conducting soldering pliers, which are not only capable of applying a substantial clamping force to the work, but which include current carrying jaws that may be separated widely to solder a comparatively long region of the work whenever desired.

Another object of the invention is to provide current conducting soldering pliers having jaws of low resistance, in order that current passing through them will develop substantial heat in the work to which the jaws are applied, and not in the jaws themselves.

A further object of the invention is to provide comparatively compact electrical soldering pliers that remain essentially cool during use, are light in weight and have current conducting jaws of long life and durability.

Still another object of the invention is to provide electrical soldering pliers that are economical to manufacture and capable of assembly with facility.

Yet a further object of the invention is to provide an improved arrangement for connecting conductors from a source of power to a pair of electrical soldering pliers.

Another object of the invention is to provide electrical soldering pliers, which may be supported appropriately for the purpose of relieving the person using them of the necessity for holding the pliers continuously during the performance of a soldering operation.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a perspective pictorial view, illustrating a soldering apparatus including an embodiment of soldering pliers;

Fig. 2 is a front elevation of the soldering pliers;

Fig. 3 is a longitudinal section taken along the line 3—3 on Fig. 2;

Fig. 4 is an enlarged cross-section taken along the line 4—4 on Fig. 3; and

Figs. 5 and 6 are side elevations illustrating two modes of using the pliers.

As disclosed in the drawings, the soldering pliers A are adapted to conduct current in the performance of the soldering work. This current may be obtained from any source, such as an outlet B in which a plug C may be inserted. A pair of leads D may run from the plug to a suitable transformer E, another pair of leads 10, 11 running from the transformer to the soldering pliers. A suitable foot operated switch F, of known construction, may be interposed in the power line to enable a person to control the passage of current through the soldering pliers in a convenient manner.

The soldering pliers A include a pair of crossing members 12, 13 pivoted to one another at their intermediate hub portions 14. These members have opposed, serrated jaws 15 on one side of their hubs and opposed handles 16 at the other side of their hubs 14. The members 12, 13 are made of a metal having high current conductivity, possessing such characteristics that solder does not cling to it readily. One such metal is aluminum or an aluminum alloy. It is to be understood, however, that copper, or any other suitable metal, can be used.

Current is conducted to each handle member 16 through a separte lead or conductor 10 or 11, which may run from the transformer E. Each conductor has an appropriate cover of insulation material 17, which may extend substantially into the hollow handle 16 to the end of its socket 18. The insulation is removed from the ends of the conductors 10, 11, which are usually made of stranded copper wire. In order to facilitate insertion of the conductors in each handle, the uninsulated end 19 has a longitudinally split conducting tube or sleeve 20 placed over it, so that the end 19 of the conductor cannot become unstranded and impede insertion of the conductor fully into the handle.

After the conductor end 19 and the split tube 20 abut the terminus of the hollow passage 18 through the handle, the tube 20 is clamped to the conductor 19 and the latter clamped to the handle 16 by one or more set screws 21 threaded through the handle and bearing against the split tube. This arrangement provides good electrical contact between the end 19 of each conductor and the split tube 20, and also between the tube and the aluminum handle 16.

In order to prevent current from passing directly between the crossing members 12, 13, they are prevented from contacting each other and are insulated from each other at their pivot point. The pivotal connection between them is provided by a rivet 22, which is preferably hollow, on which an insulated sleeve or cylinder 23 is mounted. The hub portions 14 of the crossing members 12, 13 are rotatably mounted on the insulating sleeve. These portions are also prevented from engaging each other by an intervening insulation washer or disc 24 mounted on the cylindrical sleeve 23; while the hub portions 14 are prevented from contacting the rivet 22 by end washers or discs 25 of insulating material received within recesses 26 in the outer faces of the hubs and engaging the head ends 27 of the rivet.

In assembling the plier members 12, 13 upon their pivotal connection, the rivet 22 may be passed through all of the parts 23, 24, 25, 12, 13, and its ends 27 then peened over to form heads engaging the end insulating washers 25.

Since the handle members 16 are designed for grasping by a person's hand, they are coated with an insulating material 28 to prevent current from passing through the person's body. The coating may be of any suitable type. It may consist of a synthetic resin having good insulation properties, sprayed or otherwise applied to the exterior of the metallic handle members 16 to a thickness of 1/64, 1/32 or 1/16 of an inch. The outer ends 29 of the handle may also be provided with the insulation coating to prevent inadvertent contact of the person's hand therewith.

In use, the jaws 15 of the pliers are separated so as to engage the work, or region of the work, to which a soldering connection is to be made. Current is caused to pass from one member, through the work to the other member, and, in so doing, heats the work to a temperature which readily melts the applied solder. The jaws 15 may be used for applying clamping action to the work, if desired, as well as serving as a device for passing current through the work. For example, as disclosed in Fig. 5, a pair of electrical conductors 30 may be soldered to one another by first intertwining them and by then inserting the pointed, separated jaws 15 of the pliers within spaced loops of the wire connection. The circuit may then be completed in any suitable manner, as by depressing the button on the switch F, and solder applied to the intertwined wires. The heat developed melts the solder and causes it to flow into all gaps between the entwined conductors 30. The plier handles 16 may be pressed toward each other to apply the necessary compressive force to the work, to insure good contact between the wires, this force being held after the current passage through the work has been discontinued and until the solder has cooled and solidified.

In the example illustrated in Fig. 6, it is desired to solder conductive wires 31, 32 to a terminal 33. The jaws 15 of the pliers are separated and one of the jaws is caused to engage a wire 31, while the other jaw is engaged with the terminal clip 33. The wire is then placed in contact with the terminals 33 and clamped thereagainst. Current is caused to flow through one plier member 12, the wire 31, terminal 33 and the other plier member 13, to effect heating of the work and melting of the solder applied to the point of contact between the wire 31 and the terminal 33. The handles 16 are urged toward each other to effect forcing of the wire against the terminal during the soldering operation. This force is maintained after current flow has been discontinued and until the solder has cooled and solidified. In a similar manner, the other wires 31, 32 may be soldered to the terminal 33.

The hollow pivot or rivet 22 enables the soldering pliers to be readily supported without the necessity for a person sustaining its weight. As an example, a nail (not shown) may be inserted through the hollow rivet and driven into a wooden support. This nail will then sustain the weight of the pliers, so that the operator will have both hands free to handle the work and solder. This is advantageous for tinning lead ends.

From the foregoing description of one form of the invention, it is apparent that soldering pliers have been provided that are relatively light in weight, having jaws that are permanent because of the aluminum or other metal of which they are made. In connection with one manner of using the pliers, the secondary of the transformer may have a very low resistance, supplying about one volt at open circuit, and a current of about 50 to 100 amperes when the circuit is closed. In view of the low resistance and the dimensions of the plier jaws, very little heating effect is developed in them upon passage of current; substantially all of the heating effect taking place in the work itself. In addition to their high electrical conductivity, the jaws have high strength, which enables the pliers to be used in exerting relatively great clamping force upon the work without fear of damaging the pliers or any of its parts. The strength of the pliers also permits its use in the same manner as ordinary mechanical pliers. As a consequence, a single tool may be employed in the performance of various operations, in addition to the particular soldering operation referred to above. These factors result in extensive economies in the performance of many operating steps on production lines, and contribute to a more efficient and greater use of plant facilities.

The leads or conductors 10, 11 are also readily maintained in the handles by virtue of applying the longitudinal split conducting tubes 20 on their ends. Assembly of the pliers is greatly facilitated thereby, and, after assembly, the handle portions of the pliers are readily insulated through spraying or otherwise applying the synthetic resin coating 28 thereon. The hollow rivet 22 relieves the person using the pliers of the necessity for supporting them continuously.

The inventor claims:

In a pair of pliers adapted to pass an electric current between its jaws: a pair of metallic current conducting members, each member being a unitary structure, said members having opposed metallic jaws of high current conductivity formed thereon at one end, the surfaces of the jaws being formed of a metal in which aluminum is a major ingredient said members having opposed handles at the other end; means pivotally connecting said members together between their handle and jaw ends, said means including insulation material for preventing passage of current between said members at said pivotal connection; an insulation coating on said handle; and a conductor connected to each handle adapted to impress an electromotive force between said members.

FOWLER DURST.

REFERENCES CITED

The following references are of record in the file of this patent:

UNITED STATES PATENTS

| Number | Name | Date |
|---|---|---|
| 1,231,167 | Jones | June 26, 1917 |
| 1,270,303 | Kuhn et al. | June 25, 1918 |
| 1,306,746 | Campbell | June 17, 1919 |
| 1,462,431 | Wagner | July 17, 1923 |
| 1,617,354 | Reynolds | Feb. 15, 1927 |
| 1,807,004 | Nelson | May 26, 1931 |
| 2,041,978 | Taylor | May 26, 1936 |
| 2,139,499 | Howie | Dec. 6, 1938 |
| 2,162,615 | Harlan | June 13, 1939 |
| 2,179,497 | Davitow | Nov. 14, 1939 |
| 2,226,194 | Berolsky | Dec. 24, 1940 |
| 2,243,086 | Buettell | May 27, 1941 |
| 2,295,195 | Barnum | Sept. 8, 1942 |
| 2,449,521 | Warner | Sept. 14, 1948 |

FOREIGN PATENTS

| Number | Country | Date |
|---|---|---|
| 183,006 | Switzerland | Mar. 15, 1936 |
| 666,292 | Germany | Oct. 15, 1938 |